United States Patent [19]
Mitsuharu et al.

[11] Patent Number: 4,614,470
[45] Date of Patent: Sep. 30, 1986

[54] AUTOMATIC MOUNTING AND DISMOUNTING APPARATUS OF ATTACHMENTS

[75] Inventors: Sato Mitsuharu, Numazu; Katabira Torao, Shizuoka, both of Japan

[73] Assignee: Toshiba Kikai Kabushiki Kaisha, Tokyo, Japan

[21] Appl. No.: 757,737

[22] Filed: Jul. 22, 1985

[30] Foreign Application Priority Data

Jul. 27, 1984 [JP] Japan ................ 59-156584

[51] Int. Cl.$^4$ .................................. B23C 1/00
[52] U.S. Cl. .................................. 409/230; 409/201; 409/235; 408/234; 403/322
[58] Field of Search ............... 409/201, 204, 216, 230, 409/231, 235; 408/234; 403/310, 321, 322, 328; 279/41 R, 43, 46 R, 50

[56] References Cited

U.S. PATENT DOCUMENTS 3,697,104 10/1972 Soulie et al. .................. 403/322
3,930,301 1/1976 Wagner .................. 409/235
4,384,811 5/1983 Eckstein et al. .................. 409/230

FOREIGN PATENT DOCUMENTS 2646492 5/1977 Fed. Rep. of Germany .... 409/235

Primary Examiner—Gil Weidenfeld
Assistant Examiner—Daniel W. Howell
Attorney, Agent, or Firm—Koda and Androlia

[57] ABSTRACT

An attachment is mounted and dismounted onto and from a spindle head or ram of a machine tool having a rotatable spindle by apparatus comprising a collet including a plurality of circumferentially arranged flexible members extending in parallel with the spindle from a surface on which the attachment is to be mounted, and provided with enlarged heads; a clamping rod having an opening facing the surface, a small inner diameter projection formed on the inner surface of the opening, and a large inner diameter portion adapted to receive the heads; a piston-cylinder assembly for reciprocating the clamping rod toward and away from the collet; and a release piston reciprocated in the clamping rod for radially expanding the enlarged heads of the collet.

4 Claims, 5 Drawing Figures

AUTOMATIC MOUNTING AND DISMOUNTING APPARATUS OF ATTACHMENTS

BACKGROUND OF THE INVENTION

This invention relates to an automatic mounting and dismounting apparatus of an attachment onto and from a spindle head or a ram of a machine tool.

Among prior art apparatus for automatic mounting and dismounting apparatus of an attachment such as an angle head onto and from a spindle head or a ram of a machine tool having a rotatable spindle are included:

A. Apparatus for clamping a plurality of pull studs provided for the attachment with a collet provided for the spindle head, B. Apparatus wherein the flange of the attachment to the end surface of the spindle head with a nut runner is bolted, and C. Apparatus wherein T shaped bolts provided for the spindle head are inserted and withdrawn into and out of T shaped grooves provided for the attachment and rotated in the T shaped grooves for securing the attachment to the spindle head.

However, with apparatus A, the clamping strength is not sufficient at the time of heavy cutting performed by a large machine tool, and moreover at the time of turning the attachment while indexing the same before completely removing the attachment from the spindle head it is necessary to move the attachment relative to the collet over a relatively large distance. Apparatus B not only requires a special nut runner, but also at the time of indexing the attachment, it is necessary to dismount the attachment from the spindle head and then to swing the attachment by using an external mechanism which increases the size of the apparatus and requires a long time for mounting and dismounting the attachment. In apparatus C, a complicated drive mechanism is necessary for synchronously swinging the T shaped bolts in synchronism with the T shaped grooves.

SUMMARY OF THE INVENTION

It is an object of this invention to provide an improved automatic mounting and dismounting apparatus of an attachment having a small size and simple construction and capable of positively mounting and dismounting the attachment and minimizing the amount of axial movement of the attachment at the time of mounting and dismounting the same.

According to this invention, there is provided apparatus for mounting and dismounting an attachment onto and from a spindle head or ram of a machine tool having a rotatable spindle comprising a collet including a plurality of flexible members extending in parallel with the spindle from a surface on which the attachment is to be mounted and are arranged in a circumferential direction, each flexible member being provided with a radially extending head, a clamping rod having an opening facing the surface, a small inner diameter projection formed on an inner surface of the opening, and a large inner diameter portion adapted to receive the heads, means for reciprocating the clamping rod toward and away from the collet, a release piston reciprocated in the clamping rod for radially expanding the heads of the collet, and drive means for reciprocating the release piston.

DESCRIPTION OF THE PREFERRED EMBODIMENT

Figure 1:
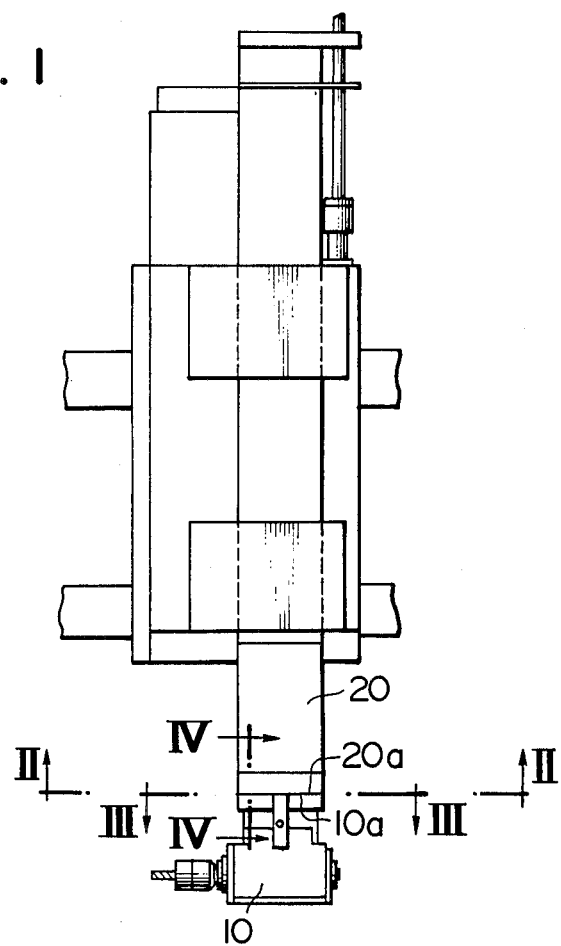
FIG. 1 is a side view of a machine tool showing one example of the position of installation of the automatic mounting and dismounting apparatus embodying the invention.

Referring now to FIG. 1, an attachment 10 is mounted on a ram 20 of a machine tool. An end surface 10a of the attachment 10 is abutted against the lower end surface 20a of ram 20. Between the end surfaces 20a and 10a is provided automatic attachment mounting and dismounting apparatus.

Figure 2:
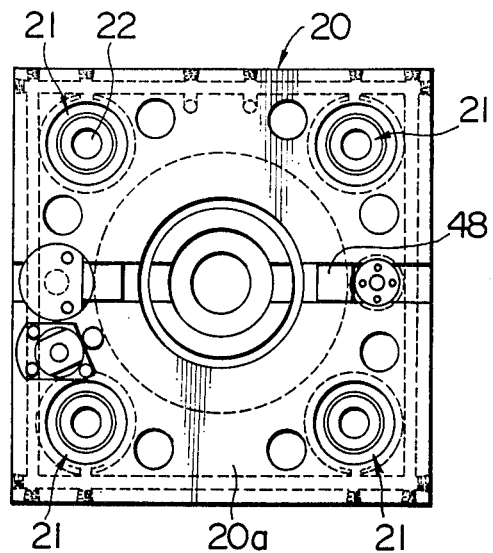
FIG. 2 is a lower end view of the ram as seen in the direction of arrow II shown in FIG. 1.
Figure 3:
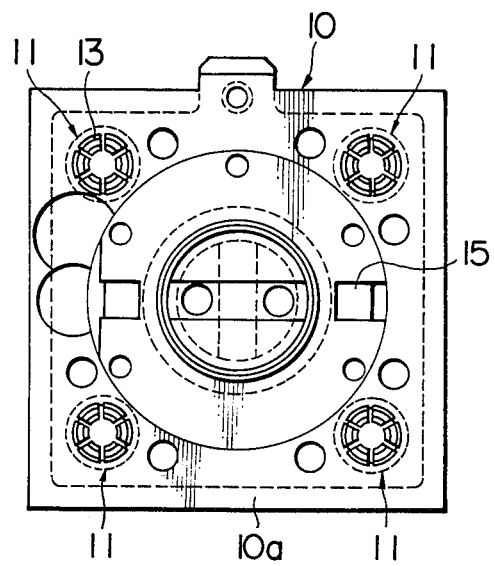
FIG. 3 is a cross-sectional view taken along a line III—III in FIG. 1.
Figure 4:
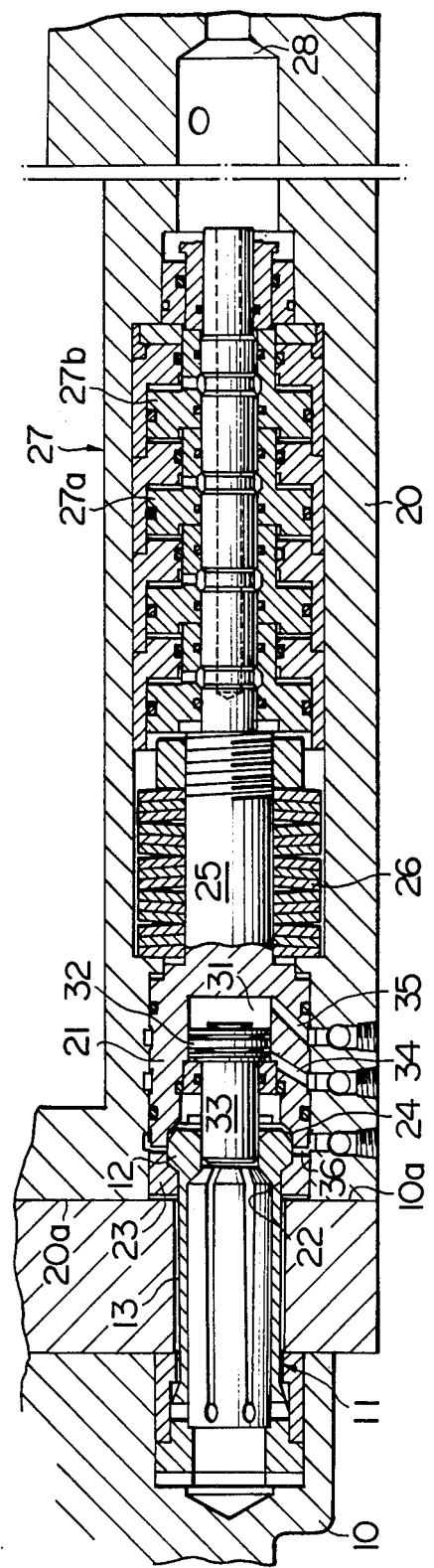
FIG. 4 is a longitudinal sectional view taken along a line IV—IV in FIG. 1 and showing a preferred embodiment of this invention.

FIGS. 2 and 3 are plan views respectively showing the lower end surface 20a and the mounting end surface 10a of the attachment, and FIG. 4 is a longitudinal sectional view showing a state in which an attachment 10 is mounted on the ram 20 by using the automatic attachment mounting apparatus. The apparatus shown in these figures comprises a collet with its one end projected from the mounting end surface 10a of the attachment 10 in parallel with the spindle, not shown, of a machine tool. The collet 11 is made up of a plurality of strip shaped flexible fingers 13 each having a radially extending head 12, the flexible fingers being spaced circumferentially. As shown in FIG. 3, collets 13 are disposed at four corners of the mounting end surface 10a of the attachment 10.

There are also provided clamping rods 21 for clamping respective collet 11. The clamping rods 21 are disposed in the ram of the machine tool such that their openings 22 open at the four corners of the lower end surface 20a of ram 20. On the inner surface of each opening 22 are formed projections 23 inwardly projecting in the radial direction, and an enlarged inner diameter portion 24 having a dimension and size to accommodate the projections 13 at the head of the collet 11 is formed to the rear side of the projection 23. A shaft 25 extending in parallel with the spindle and rotatably contained in ram 20 is connected to the rear side of clamping rod 21, the shaft portion 25 being driven by an actuating mechanism for reciprocating the clamp rod 21. The actuating mechanism comprises a plurality of dish springs 26 pulling the clamp rod 21 to the rear and an oil pressure cylinder 27 disposed to the rear side of the dish springs 26 for advancing the clamping rod 21. The oil pressure cylinder 27 contains a plurality of serially arranged telescoped component pistons 27a, 27b, . . . . Pressurized oil is supplied to the oil pressure cylinder 27 via an inlet port 28.

The clamping rod 21 is formed with a cylinder chamber 31 for receiving a piston flange 32 to be slidable in the axial direction. A release piston 33 is connected to the flange 32 to extend toward the opening 22 of the clamping rod 21 to engage the inner surface of the heads 12 to urge them outwardly. An unclamping oil passage 34 and a clamping oil passage 35 open into the front and rear ends of the cylinder chamber 31. The release piston 33 is reciprocated by a driving mechanism constituted by cylinder chamber 31, piston plunger 32, and oil passages 34 and 35. A passage 36 is opened into the large diameter portion 24 of the clamping rod for ejecting air for cleaning the large diameter portion 24.

Figure 5:
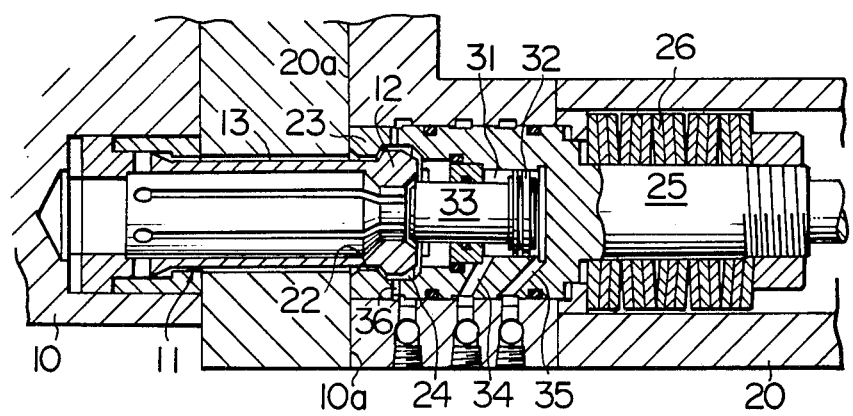
FIG. 5 is a partial sectional view showing an unclamped state of the mounting and dismounting apparatus according to this invention.

In operation, for mounting a predetermined attachment 10 on ram 20, pressurized oil is supplied to oil passage 34 to retract the release piston 33 as shown in FIG. 5 for retracting the lefthand end of piston 33 from the large diameter portion 24 of the clamping rod 21 and for supplying pressurized oil through oil passage 28 for advancing shaft portion 25 over a small distance, for example 1 mm, against the resiliency of the dish shaped springs 26, thereby unclamping the clamping rod 21. Under this state, the mounting end surface 10a of attachment 10 is moved in the axial direction to come to engage the lower end surface 20a of ram 20. Then the diameter of the top of collet 11 is reduced, whereby it is inserted in the large diameter portion 24 of clamping rod 24 after passing through opening 22. At this time, the alignment of collets 11 at four corners of the mounting end surface and the clamping rod is effected by the cooperation of keys 15 and key slot 48. Following the insertion of the leading end of each collet 11 into the large diameter portion 24 of clamping rod 21 as shown in FIG. 5, the pressurized oil is supplied to clamping oil passage 35 for advancing release piston 33 into collet 11 thus expanding outwardly the flexible members 13. Then as supply of the pressurized oil to inlet port 28 is stopped for stopping the oil pressure piston, the shaft member 25 is retracted by the resilient force of dish shaped springs 26 so that inward projections 23 at the opening 22 of clamping rod 21 clamp heads 12 of each collet 11 thus pulling the same to the right as viewed in FIG. 4 and FIG. 5. In this manner, respective collets are positively clamped by clamping rods 21 thus fixedly securing attachment to ram 20. FIG. 4 shows this state.

According to this invention, since the head of the collet 11 is clamped between the release piston 33 and clamping rod 21 and since the head of the collet 11 is pulled by the projections 23 of clamping rod 21, the collet is clamped positively and strongly. Different from a prior art method of clamping a pull stud with the inner surface of a collet, since the outer surface is clamped, the diameter of the clamping member can be increased thus increasing clamping force. Furthermore, the clamping rod 21 can be unclamped by merely advancing clamping rod 21 over only a small distance, instead of several to 20 mm. For this reason, the degree of flexture of dish shaped springs and the number thereof can be reduced. Moreover, the force necessary for deforming the dish shaped springs may be reduced, with the result that the oil pressure cylinder can be miniaturized. Moreover, since the piston in the cylinder is constituted by a plurality of serially arranged telescoped pistons 27a, 27b, . . . , the outer diameter of the oil pressure cylinder 27 can be reduced thus reducing the size of the clamping rod driving mechanism.

Instead of mounting the attachment on the ram of a machine tool, it is also possible to mount the attachment on a rotable spindle head of a machine tool.

As above described, according to this invention it is not only possible to readily and accurately mount and dismount an attachment onto and from the ram or spindle head but also can reduce the size of the apparatus.

What is claimed is:

1. Apparatus for mounting and dismounting an attachment onto and from a spindle head or ram of a machine tool having a rotatable spindle comprising:

a collet including a plurality of flexible members extending in parallel with said spindle from a surface on which said attachment is to be mounted, said flexible members being arranged in a circumferential direction, each flexible member being provided with a radially extending head;

a clamping rod having an opening facing said surface, a small inner diameter projection formed on an inner surface of said opening, and a large inner diameter portion adapted to receive said heads;

means for reciprocating said clamping rod toward and away from said collet;

a release piston reciprocated in said clamping rod for radially expanding said heads of said collet; and drive means for reciprocating said release piston.

2. The apparatus according to claim 1 wherein said clamping rod reciprocating means comprises dish shaped spring means and piston means which are contained in an oil pressure cylinder and disposed on a rear side of said clamping rod.

3. The apparatus according to claim 2 wherein said piston means comprises a plurality of telescoped piston members.

4. The apparatus according to claim 1 wherein said release piston drive means comprises a cylinder formed by said clamping rod piston member slidably received in said cylinder and means for supplying pressurized oil to both sides of said cylinder.

* * * * *